(12) United States Patent
Ishihara

(10) Patent No.: US 8,902,319 B2
(45) Date of Patent: Dec. 2, 2014

(54) IMAGE SIGNAL PROCESSING APPARATUS, IMAGE SIGNAL PROCESSING METHOD, IMAGE DISPLAY APPARATUS, TELEVISION RECEIVER, AND ELECTRONIC DEVICE

(75) Inventor: Tomoyuki Ishihara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 968 days.

(21) Appl. No.: 12/737,710

(22) PCT Filed: May 28, 2009

(86) PCT No.: PCT/JP2009/059807
§ 371 (c)(1),
(2), (4) Date: Feb. 9, 2011

(87) PCT Pub. No.: WO2010/021180
PCT Pub. Date: Feb. 25, 2010

(65) Prior Publication Data
US 2011/0128449 A1 Jun. 2, 2011

(30) Foreign Application Priority Data
Aug. 22, 2008 (JP) ................................. 2008-214614

(51) Int. Cl.
| | |
|---|---|
| H04N 5/228 | (2006.01) |
| G09G 3/20 | (2006.01) |
| H04N 5/782 | (2006.01) |
| H04N 5/66 | (2006.01) |
| H04N 5/14 | (2006.01) |
| G09G 3/36 | (2006.01) |
| H04N 5/85 | (2006.01) |

(52) U.S. Cl.
CPC *G09G 3/20* (2013.01); *H04N 5/144* (2013.01); *G09G 2340/0435* (2013.01);

(Continued)

(58) Field of Classification Search
CPC ...................... H04N 5/23261–5/23263; H04N 5/2327–5/2321
See application file for complete search history.

(56) References Cited

U.S. PATENT DOCUMENTS 5,025,312 A * 6/1991 Faroudja ....................... 348/620
5,029,004 A * 7/1991 Shibayama ................... 348/625
(Continued)

FOREIGN PATENT DOCUMENTS

| | | |
|---|---|---|
| CN | 1765121 | 4/2006 |
| EP | 1 605 689 | 12/2005 |

(Continued)

*Primary Examiner* — Sath V Perungavoor
*Assistant Examiner* — Matthew J Anderson
(74) *Attorney, Agent, or Firm* — Harness, Dickey & Pierce, P.L.C.

(57) ABSTRACT

An image signal processing apparatus includes: a basic movement level finding section for detecting a movement level of a video image; a timing controller for dividing one frame period into a plurality of periods containing a sub-frame A period and a sub-frame B period; a sub-frame A image signal generating section for subjecting, to a smoothing process, image signals which are supplied to pixels, in the sub-frame A period, in accordance with the movement level of the video image; a sub-frame B image signal generating section for subjecting, to an emphasizing process, image signals which are supplied to pixels, in the sub-frame B period, in accordance with the movement level of the video image; and an applied movement level finding section for finding, from a movement level of a video image of a current frame period and a movement level of a video image of a previous frame period, an applied movement level which is applied to the sub-frame A image signal generating section and/or the sub-frame B image signal generating section.

20 Claims, 12 Drawing Sheets

(52) U.S. Cl.
CPC ......... *G09G 2320/103* (2013.01); *H04N 5/142* (2013.01); *G09G 2320/0271* (2013.01); *G09G 3/2022* (2013.01); *G09G 3/3611* (2013.01); *G09G 2320/041* (2013.01); *H04N 5/85* (2013.01); *G09G 2320/0261* (2013.01); *G09G 2320/106* (2013.01); *G09G 2360/18* (2013.01); *H04N 5/782* (2013.01); *G09G 2360/16* (2013.01); *G09G 2340/16* (2013.01); *H04N 5/66* (2013.01); *G09G 2320/0247* (2013.01)
USPC .................. 348/208.4; 348/241; 348/208.13

(56) References Cited

U.S. PATENT DOCUMENTS

| | | | | |
|---|---|---|---|---|
| 5,926,577 | A * | 7/1999 | Kasahara et al. | 382/266 |
| 5,982,953 | A * | 11/1999 | Yanagita et al. | 382/294 |
| 6,404,460 | B1 * | 6/2002 | Chen et al. | 348/606 |
| 6,496,598 | B1 * | 12/2002 | Harman | 382/154 |
| 6,965,369 | B2 * | 11/2005 | Rensberger | 345/156 |
| 7,633,556 | B2 * | 12/2009 | Min | 348/606 |
| 7,817,127 | B2 * | 10/2010 | Take | 345/96 |
| 7,912,323 | B2 * | 3/2011 | Okuno et al. | 382/300 |
| 7,940,240 | B2 * | 5/2011 | Takeuchi et al. | 345/94 |
| 8,401,326 | B2 * | 3/2013 | Chen et al. | 382/260 |
| 8,482,579 | B2 * | 7/2013 | Ishihara | 345/611 |
| 2004/0047513 | A1 * | 3/2004 | Kondo et al. | 382/254 |
| 2004/0201564 | A1 | 10/2004 | Sugino et al. | |
| 2004/0263495 | A1 | 12/2004 | Sugino et al. | |
| 2005/0057539 | A1 | 3/2005 | Ong | |
| 2005/0156843 | A1 | 7/2005 | Itoh et al. | |
| 2005/0162360 | A1 * | 7/2005 | Ishihara et al. | 345/89 |
| 2006/0119617 | A1 | 6/2006 | Toyooka et al. | |
| 2006/0192896 | A1 | 8/2006 | Sawa | |
| 2006/0227249 | A1 | 10/2006 | Chen et al. | |
| 2007/0126928 | A1 | 6/2007 | Klompnhouwer et al. | |
| 2007/0165961 | A1 * | 7/2007 | Lu | 382/254 |
| 2007/0262974 | A1 | 11/2007 | Take | |
| 2007/0263121 | A1 | 11/2007 | Take et al. | |
| 2007/0285382 | A1 | 12/2007 | Feng | |
| 2008/0136752 | A1 | 6/2008 | Inoue et al. | |
| 2008/0180424 | A1 * | 7/2008 | Ishihara | 345/204 |
| 2008/0284719 | A1 * | 11/2008 | Yoshida | 345/102 |
| 2009/0207186 | A1 | 8/2009 | Toyooka et al. | |
| 2010/0007789 | A1 | 1/2010 | Mori et al. | |
| 2011/0128449 | A1 * | 6/2011 | Ishihara | 348/701 |

FOREIGN PATENT DOCUMENTS

| | | |
|---|---|---|
| JP | 3295437 | 6/2002 |
| JP | 2002351382 A | 12/2002 |
| JP | 2005-70810 | 3/2005 |
| JP | 2006072359 A | 3/2006 |
| JP | 2006091412 A | 4/2006 |
| JP | 2006184896 A | 7/2006 |
| JP | 2007515874 T | 6/2007 |
| JP | 2007-304205 | 11/2007 |
| JP | 2007304204 A | 11/2007 |
| JP | 2007316161 A | 12/2007 |
| JP | 2009-251026 | 10/2009 |
| RU | 2118839 | 9/1998 |
| RU | 2310926 | 11/2007 |
| WO | WO-2007052441 A1 | 5/2007 |
| WO | WO 2007/088515 | 8/2007 |
| WO | WO 2008/050502 | 5/2008 |

* cited by examiner

IMAGE SIGNAL PROCESSING APPARATUS, IMAGE SIGNAL PROCESSING METHOD, IMAGE DISPLAY APPARATUS, TELEVISION RECEIVER, AND ELECTRONIC DEVICE

TECHNICAL FIELD

The present invention relates to an image signal processing apparatus which improves quality of a moving image of an image display apparatus based on a hold-type display apparatus such as a liquid crystal display apparatus.

BACKGROUND ART

An image display apparatus based on a hold-type display apparatus such as a liquid crystal display apparatus heretofore has had a problem in that quality of a moving image deteriorates (i.e., edge blur occurs).

The following explains deterioration of quality of a moving image (edge blur) of a conventional hold-type display apparatus, by taking, as an example, a case where as illustrated in FIG. 2, a region indicated by image signals having a luminance level of 75% horizontally moves on a background indicated by image signals having a luminance level of 25%.

FIG. 13 shows a distribution of luminance levels of input image signals which are supplied to pixels on one horizontal line within one screen image indicated by input image signals which are supplied in one frame in a case where an image illustrated in FIG. 2 is displayed.

FIG. 14 shows a temporal transition of a distribution of display luminances, for a case where the region horizontally moves on a screen of the conventional hold-type display apparatus. In general, a viewer watching a screen follows, with his eyes, an object which moves horizontally on the screen. Accordingly, the viewer recognizes, as a visual luminance level, an integral quantity obtained by integrating display luminance levels in a direction indicated by arrows.

The integral quantity, which is recognized by the viewer as the visual luminance level, is an average of a summation, in the direction of the arrows, of respective luminance levels of time periods which average is taken in a case where the object (i.e., area having a luminance level of 75%) moves at a speed of 8 pixels/frame. As shown in the graph of FIG. 14, the distribution of luminance levels is such that shaded regions having a luminance level of 75% are connected by inclined line segments in the vicinity of boundaries between regions having a luminance level of 25% and the shaded regions having a luminance level of 75%. A viewer recognizes, as edge blurs, (i) an area defined by a horizontal width between a rightmost inclined line segment and an adjacent one and (ii) an area defined by a horizontal width between a leftmost inclined line segment and an adjacent one. This causes deterioration of quality of a moving image of the hold-type image display apparatus.

The simplest methods for alleviating the edge blur include a method in which a minimum luminance level (i.e., black) display period is provided as a part of one frame period. According to the method, however, a bright screen image and a dark screen image are displayed in every one frame period. This causes a flicker. Every frame period has the minimum luminance level display period also in a case where an input image signal has a maximum signal level. This causes another problem of a decrease in luminance level.

The following describes a case where as illustrated in FIG. 4, a width of a region having a luminance level of 75% is smaller than a moving distance that the region moves, in one frame period, on a background having a luminance level of 25%.

FIG. 15 shows a distribution of luminance levels of input image signals which are supplied to pixels on one horizontal line within one screen image indicated by input image signals which are supplied in one frame period in a case where an image illustrated in FIG. 4 is displayed. FIG. 16 shows a temporal transition of a distribution of display luminances, for a case where the region horizontally moves on the screen of the conventional hold-type display apparatus.

The integral quantity, which is recognized by the viewer as the visual luminance level, is an average of a summation of respective luminance levels of time periods which average is taken in a case where an object (i.e., area having a luminance level of 75%) moves at a speed of 8 pixels/frame.

As illustrated in FIG. 17, a large edge blur such as the aforementioned one does not occur. On the other hand, a luminance level of the object which moves horizontally is considerably decreased from a normal luminance level of 75% to 44%. That is, the object looks considerably darker than a normal case. This also contributes to deterioration of quality of a moving image.

Conversely, in a case where the background has a high luminance level and the object has a low luminance level, there occurs another phenomenon such that the object looks brighter for a similar reason. This also contributes to deterioration of quality of a moving image.

Patent Literature 1 discloses a method for alleviating an edge blur without causing a flicker. According to the method, as illustrated in FIG. 17, a virtual frame image which is temporally located between two adjacent frames is generated by estimation so as to be inserted between the two adjacent frames. The method thus makes it possible to alleviate the edge blur so as to suppress deterioration of quality of a moving image.

However, the method has a difficulty in completely accurate estimation of image signals which are temporally located between the two adjacent frames. As a result, an error can be caused by inaccurate estimation.

With regard to one horizontal line within a screen on which as illustrated in FIG. 2, the object having a luminance level of 75% horizontally moves on the background having a luminance level of 25%, (a) of FIG. 18 shows an example of a luminance level distribution of input image signals of an (N–1)th frame, and (b) of FIG. 18 shows an example of a luminance level distribution of input image signals of an N-th frame. In a case where a virtual frame which is temporally located between the (N–1)th frame and the N-th frame can be generated in this case by accurate estimation, a luminance level distribution is such that as shown in (c) of FIG. 18, the region having a luminance level of 75% is located midway between the (N–1)th frame and the N-th frame. However, there is a difficulty in completely accurate estimation of image signals which are temporally located between two adjacent frames. As a result, an error can be caused by inaccurate estimation. (d) of FIG. 18 shows an example of a virtual frame containing such an error. As indicated by an arrow, a pixel having a luminance of 25% is located in a position where a luminance level is normally 75%.

On the other hand, Patent Literature 2 discloses a technique in which an image whose high spatial frequency has been removed and an image whose high spatial frequency is emphasized are repeatedly displayed so that a blur due to image movement is prevented. According to Patent Literature 2, however, both images are generated from one same input image. Accordingly, a deviation is caused in a relationship between space time and a luminance centroid with respect to a viewer who follows an object moving on a screen. This leads to a problem in that it is impossible to appropriately maintain a distribution of integrated luminances which are observed at a front edge and a rear edge of the displayed object. In addition, since positive values of high spatial frequency component are removed, an emphasized frame always has a high luminance. This leads to a problem in that a flicker occurs on an entire screen.

The problems of Patent Literatures 1 and 2 can be solved by a technique disclosed in the following Patent Literature 3 by inventors of the present invention.

According to Patent Literature 3, one frame period is divided into a sub-frame period A and a sub-frame period B, and a blurring process and an emphasizing process are carried out in the sub-frame period A and in the sub-frame period B, respectively. The technique thus makes it possible to improve quality of a moving image so as to solve the problem of Patent Literature 1.

Further, Patent Literature 3 discloses a technique in which a blurred frame is generated, and an average value between a latest frame and a previous frame is used. Thus, according to Patent Literature 3, it is possible to realize an appropriate relationship between space time and a luminance centroid with respect to a viewer who follows an object moving on a screen, so that it is possible to keep an appropriate distribution of integrated luminances which are observed at a front edge and at a rear edge of a displayed object. Further, according to Patent Literature 3, a broad luminance of the blurred frame and a broad luminance of the emphasizing frame are identical to each other, so that no flicker occurs on an entire screen.

Other than Patent Literature 3, techniques for suppressing a flicker include Patent Literatures 4, 5, and 6.

CITATION LIST

Patent Literature 1
Japanese Patent No. 3295437 (Issue Date: Jun. 24, 2002)
Patent Literature 2
US Patent Application Publication, US2006/0227249 (Publication Date: Oct. 12, 2006)
Patent Literature 3
PCT International Application Publication, WO2007/052441 (Date of International Publication: May 10, 2007)
Patent Literature 4
Japanese Patent Application Publication, Tokukai, No. 2002-351382 A (Publication Date: Dec. 6, 2002)
Patent Literature 5
Japanese Patent Application Publication, Tokukai, No. 2006-184896 A (Publication Date: Jul. 13, 2006)
Patent Literature 6
Japanese Patent Application Publication, Tokukai, No. 2007-304204 A (Publication Date: Nov. 22, 2007)

SUMMARY OF INVENTION

Technical Problem

According to the techniques disclosed in Patent Literatures 3 to 6, however, the following problem arises although it is possible to suppress a flicker.

In a case where in the emphasizing process, an externally-supplied input image signal which has not been subjected to the emphasizing process has a signal level close to a minimum or maximum image signal level that can be displayed, the emphasizing process cannot be sufficiently carried out since it is impossible to further emphasize the externally-supplied input image signal. Accordingly, a time integrated luminance becomes insufficient or excessive, as compared to an appropriate luminance. A viewer recognize this as an inappropriate luminance. As a result, quality of a moving image is deteriorated.

Thus, none of the conventional techniques can sufficiently improve quality of a moving image.

The present invention was made in view of the problem. An object of the present invention is to provide an image signal processing apparatus which makes it possible to sufficiently improve quality of a moving image of an image display apparatus based on a hold-type display apparatus such as a liquid crystal display apparatus.

Solution to Problem

In order to attain the object, an image signal processing apparatus of the present invention is an image signal processing apparatus provided in an image display apparatus for displaying an image, in accordance with image signals supplied to respective pixels, for every frame period corresponding to image signals for one (1) screen, the image signal processing apparatus including: a movement level detector section which detects a first movement level of a video image corresponding to a current frame period, by comparing (i) image signals corresponding to the current frame period with (ii) image signals corresponding to a previous frame period followed by the current frame period; a dividing section which divides one (1) frame period into a plurality of periods containing at least one sub-frame A period and at least one sub-frame B period; a first image processing section which carries out a smoothing process in the at least one sub-frame A period, in accordance with a second movement level, with respect to input image signals to be supplied to respective pixels; a second image processing section which carries out an emphasis process in the at least one sub-frame B period, in accordance with the second movement level, with respect to input image signals to be supplied to respective pixels; and a movement level finding section which finds the second movement level from (i) the first movement level of the video image corresponding to the current frame period and (ii) a previous movement level of a video image corresponding to the previous frame period.

According to the arrangement, the image signal processing apparatus includes: a dividing section which divides one (1) frame period into at least one sub-frame A period and at least one sub-frame B period; a first image processing section which carries out a smoothing process in the at least one sub-frame A period, in accordance with a second movement level, with respect to input image signals to be supplied to respective pixels; and a second image processing section which carries out an emphasis process in the at least one sub-frame B period, in accordance with the second movement level, with respect to input image signals to be supplied to respective pixels. This makes it possible to carry out the smoothing process in one sub-frame period in accordance with the second movement level, so as to decrease a difference between respective image signal levels of a target pixel and a peripheral pixel. In addition, this makes it possible to carry out the emphasizing process in the other sub-frame period in accordance with the second movement level, so as to increase a difference between respective image signal levels of a target pixel and a peripheral pixel.

Further, the image signal processing apparatus includes the movement level finding section which finds the second movement level, which is supplied to the first image processing section and/or the second image processing section, from (i)

the first movement level, detected by the movement level detector section, of the video image corresponding to the current frame period and (ii) a previous movement level, detected by the movement level detector section, of a video image corresponding to the previous frame period. Accordingly, the smoothing and emphasizing processes are always carried out in successive frames. This makes it possible to prevent a flicker which is a concern of a case where a frame period which is subjected to none of the smoothing and emphasizing processes cyclically shows up as is the case where still images of a plurality of frames are cyclically displayed like a slow-motion replay or the like.

Thus, the arrangement makes it possible to sufficiently improve quality of a moving Image.

Further, the image signal processing apparatus can further include a retaining section which retains the second movement level found by the movement level finding section, the movement level finding section finding, by using the second movement level retained by the retaining section as the previous movement level, the second movement level which is supplied to the first image processing section and/or the second image processing section.

In this case, the image processing apparatus includes the retaining section. This makes it possible to swiftly carry out the comparison of movement levels and the process of supplying the second movement level.

Further, the image signal processing apparatus can be arranged such that the first image processing section and the second image processing section carry out the smoothing process and the emphasis process, at respective processing intensities which vary depending on the second movement level found by the movement level finding section.

Specifically, the following processes are carried out.

If Mc<Mh, the movement level finding section supplies to the first image processing section and the second image processing section, as the second movement level, a simple average or a weighted average of Mc and Mh, where Mc is the first movement level, and Mh is the second movement level retained by the retaining section.

Further, if Mc≥Mh, the movement level finding section supplies Mc to the first image processing section and the second image processing section, as the second movement level, where Mc is the first movement level, and Mh is the second movement level retained by the retaining section.

Thus, the movement level finding section finds the second movement level in consideration of the first movement level Mc and the second movement level Mh retained by the retaining section. This allows the first image processing section and the second image processing section to appropriately carry out the smoothing process and the emphasizing process in respective frames. This makes it possible to further suppress a flicker.

In a case where an input image signal has a signal level close to a maximum or minimum image signal level, the input image signal cannot have an image signal level higher than the maximum image signal level and have an image signal level lower than the minimum image signal level even if the emphasizing process has been carried out with respect to the input image signal. Accordingly, the emphasizing process cannot be carried out. This leads to a problem in that quality of a moving image cannot be improved.

In view of this, the present invention proposes an image signal processing apparatus arranged as below, as an arrangement for sufficiently carrying out the emphasizing process.

That is, an image signal processing apparatus of the present invention is an image signal processing apparatus provided in an image display apparatus for displaying an image, in accordance with image signals supplied to respective pixels, for every frame period corresponding to image signals for one (1) screen, the image signal processing apparatus including: a dividing section which divides one (1) frame period into a plurality of periods containing at least one sub-frame A period and at least one sub-frame B period; a first image processing section which carries out a smoothing process with respect to input image signals to be supplied to respective pixels, in the at least one sub-frame A period; and a second image processing section which carries out an emphasis process with respect to input image signals to be supplied to respective pixels, in the at least one sub-frame B period; said first image processing section carrying out the smoothing process by use of an intergradation width which is set such that each of the input image signals which have been subjected to the smooth process has a smaller signal level as it is closer to a maximum signal level or a minimum signal level of image signals which the image display apparatus can display.

According to the arrangement, the first image processing section carries out the smoothing process by use of the intergradation width which is set such that each of the input image signals which have been subjected to the smooth process has a smaller signal level as it is closer to a maximum signal level or a minimum signal level of image signals which the image display apparatus can display. This makes it possible to obtain an appropriate luminance even if the second image processing section cannot sufficiently emphasize an image signal for the reason that it has a too large or small signal level.

Thus, the arrangement makes it possible to sufficiently improve quality of a moving image.

Further, the image signal processing apparatus can further include a temperature detector section which detects a temperature in the image signal processing apparatus, said first image processing section carrying out the smoothing process by use of an intergradation width which is set such that each of the input image signals which have been subjected to the smoothing process has a smaller signal level as a temperature detected by the temperature detector section is lower than a predetermined temperature.

This makes it possible to appropriately carry out the smoothing process and the emphasizing process even if an image display apparatus having the image signal processing apparatus is a liquid crystal display apparatus whose response speed decreases with a temperature decrease. As a result, quality of a moving image can be improved.

Advantageous Effects of Invention

As described above, an image signal processing apparatus of the present invention is an image signal processing apparatus provided in an image display apparatus for displaying an image, in accordance with image signals supplied to respective pixels, for every frame period corresponding to image signals for one (1) screen, the image signal processing apparatus including: a movement level detector section which detects a first movement level of a video image corresponding to a current frame period, by comparing (i) image signals corresponding to the current frame period with (ii) image signals corresponding to a previous frame period followed by the current frame period; a dividing section which divides one (1) frame period into a plurality of periods containing at least one sub-frame A period and at least one sub-frame B period; a first image processing section which carries out a smoothing process in the at least one sub-frame A period, in accordance with a second movement level, with respect to input image signals to be supplied to respective pixels; a second image processing section which carries out an emphasis process in the at least one sub-frame B period, in accordance with the second movement level, with respect to input image signals to be supplied to respective pixels; and a movement level finding section which finds the second movement level from (i) the first movement level of the video image corresponding to the current frame period and (ii) a previous movement level of a video image corresponding to the previous frame period. This makes it possible to suppress a flicker and improve quality of a moving image.

Figure 3:
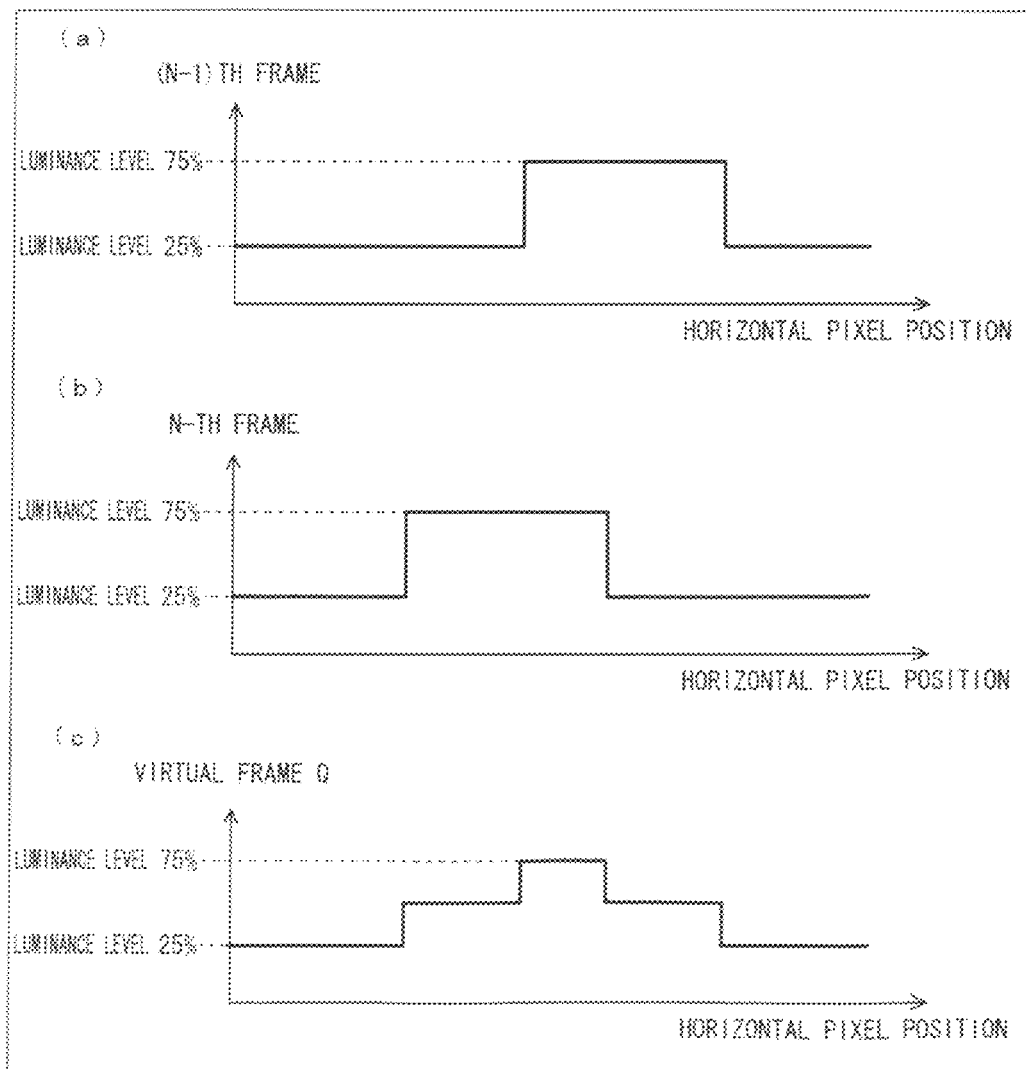

(a) to (c) of FIG. 3 are graphs showing, for respective frames, luminance levels at horizontal pixel positions.

Figure 4:
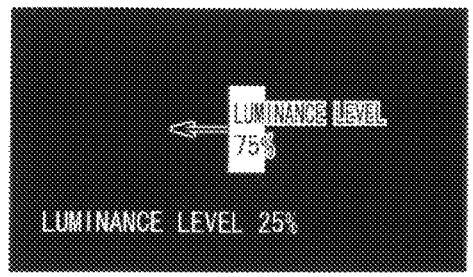

FIG. 4 is a view illustrating that a region having an image signal luminance level of 75% horizontally moves on a background having an image signal luminance level of 25%. Specifically, FIG. 4 illustrates a case where the region has a smaller width than its movement amount on the background in a single frame period.

Figure 5:
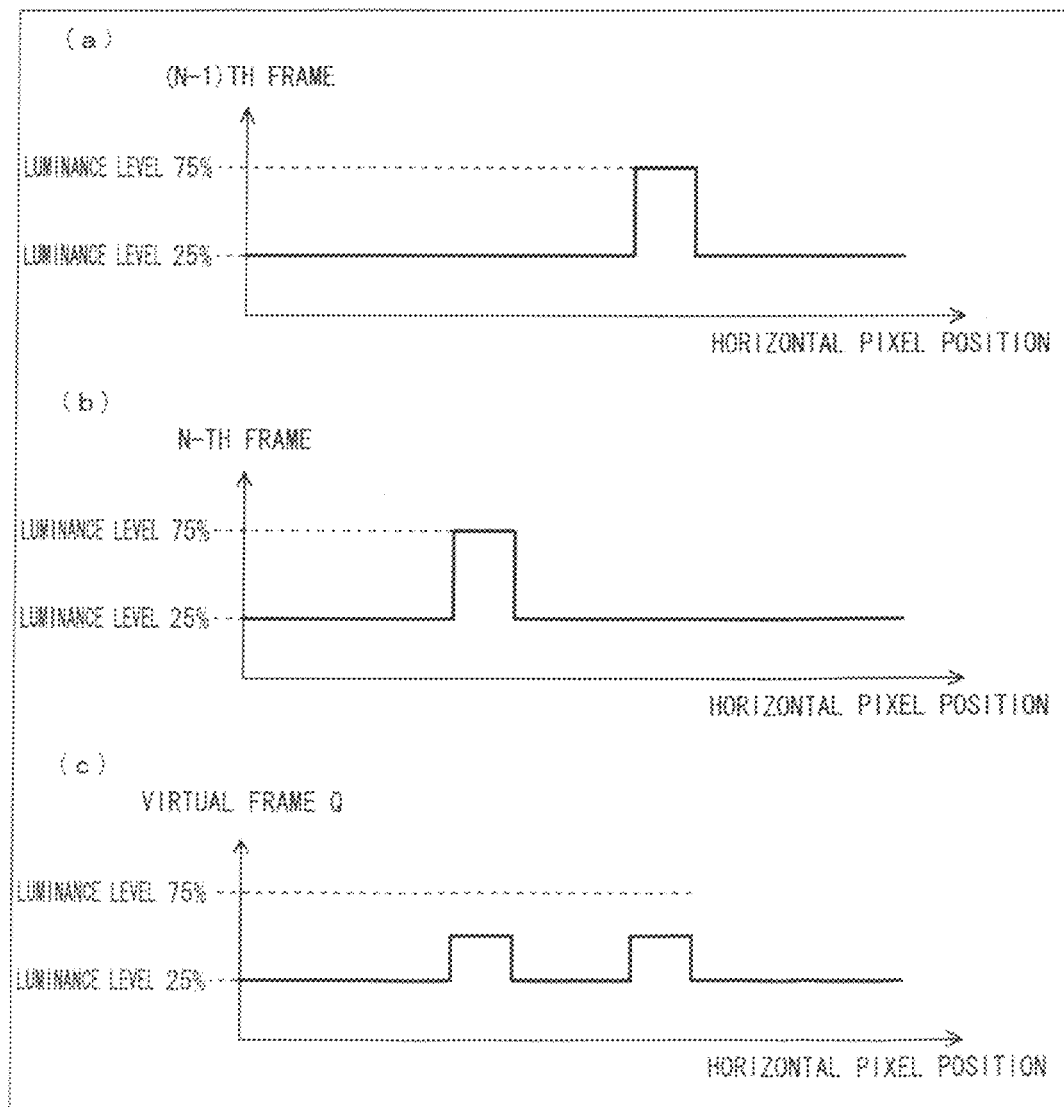

(a) to (c) of FIG. 5 are graphs showing, for respective frames, luminance levels at horizontal pixel positions.

Figure 6:
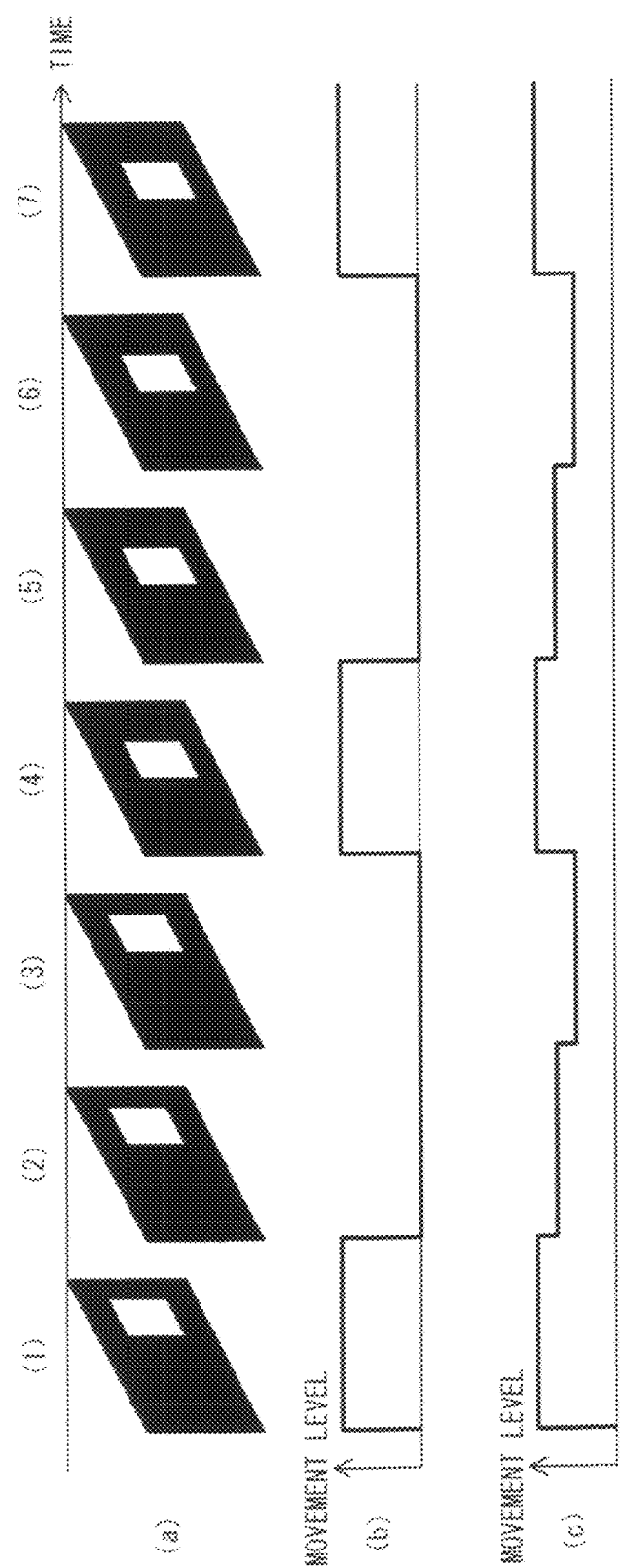

FIG. 6 is a view illustrating, for the case of a slow-motion replay on the image display apparatus, states of input images.

Figure 7:
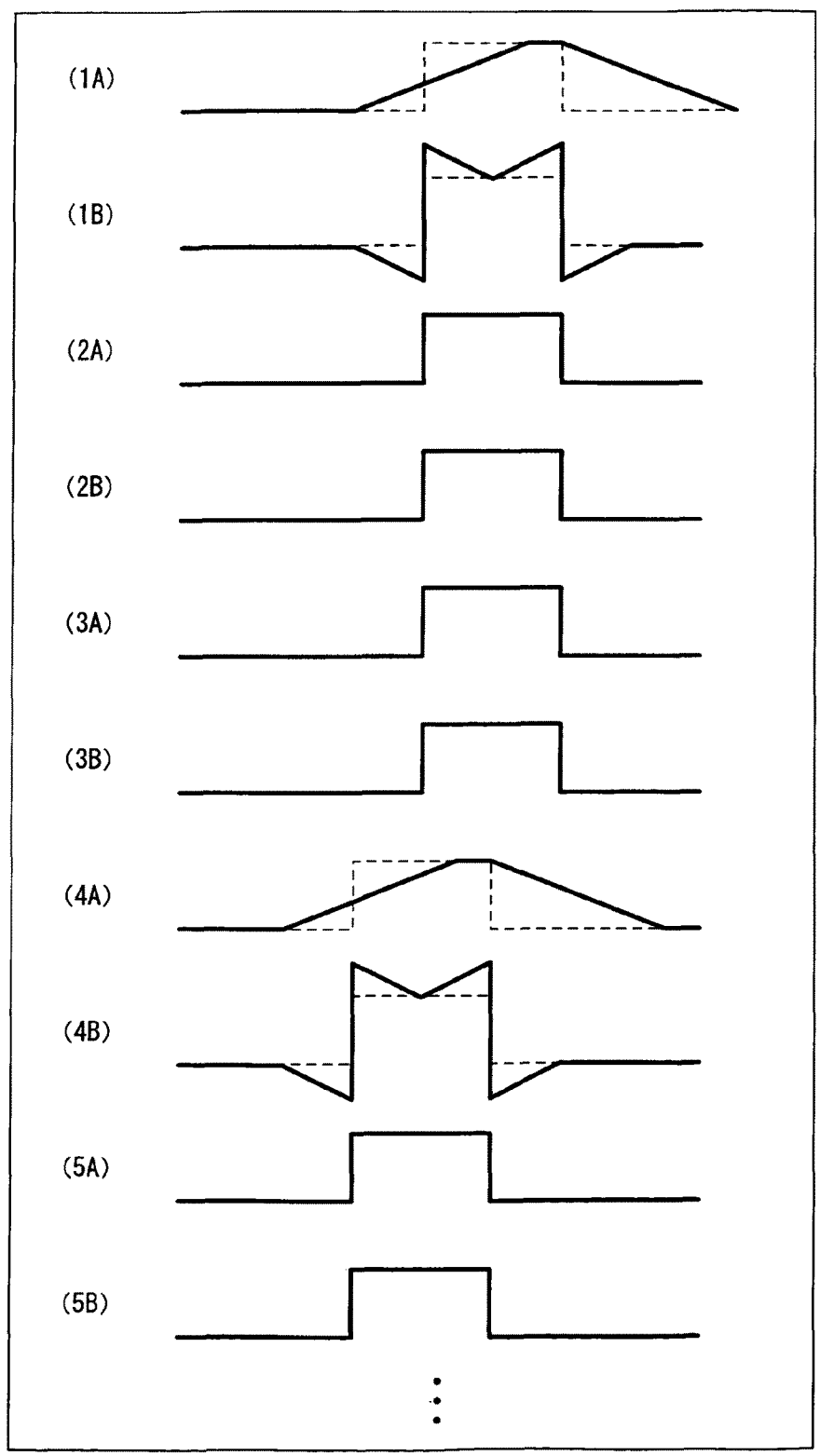

FIG. 7 is a view illustrating results of smoothing and emphasizing processes carried out with respect only to frames in FIG. 6 in which movement levels are not zero.

Figure 8:
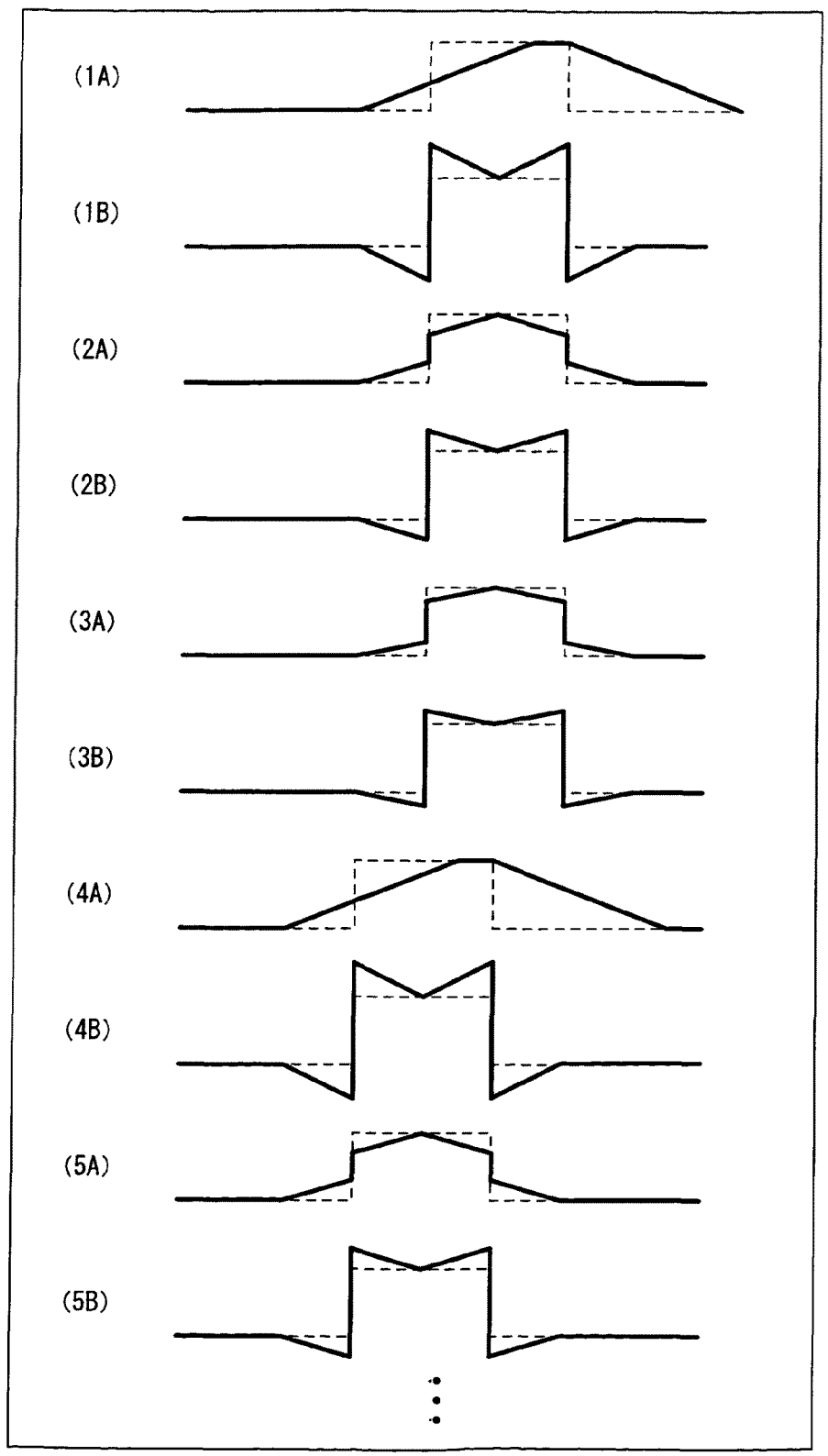

FIG. 8 is a view illustrating results of smoothing and emphasizing processes carried out with respect to every frame in FIG. 6.

Figure 9:
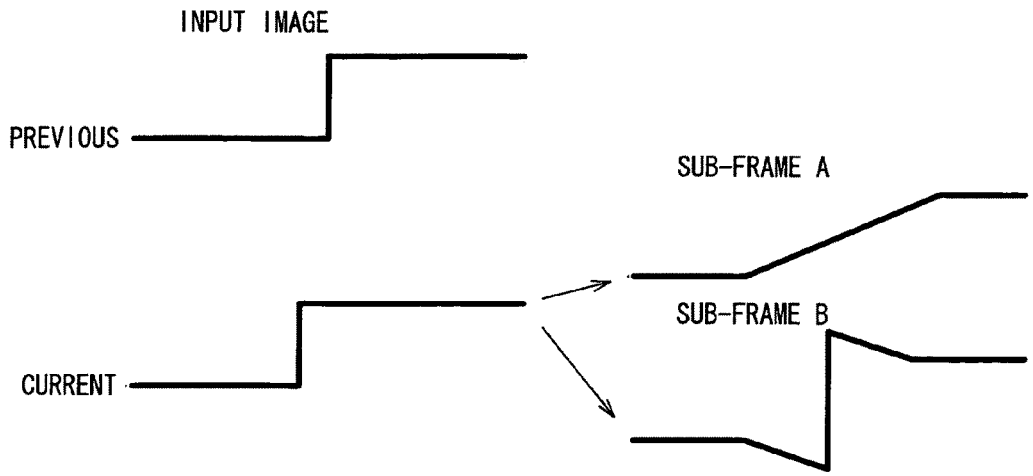

FIG. 9 is a view illustrating a distribution of image signals subjected in a sub-frame A to the smoothing process in consideration of an input image of a previous frame, and a distribution of image signals subjected to the emphasizing process in a sub-frame B.

Figure 10:
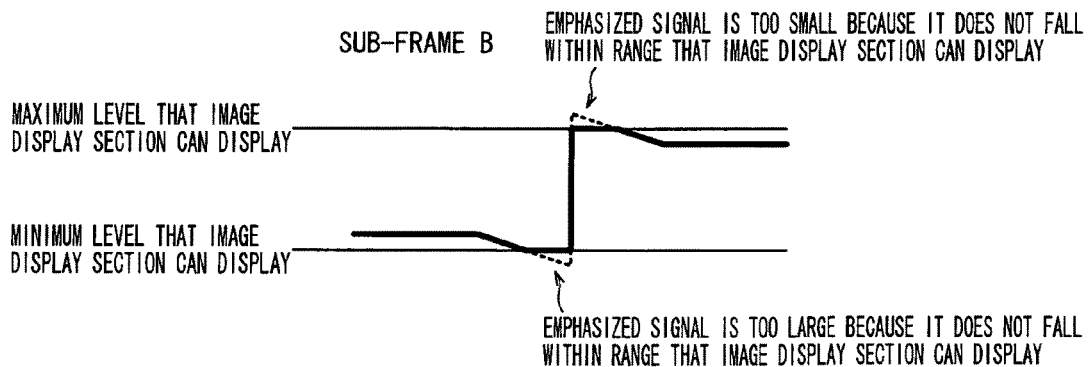

FIG. 10 is an explanatory view illustrating a relationship between an image signal level of an image signal subjected to an ideal emphasizing process and maximum and minimum levels that the image display apparatus can display.

Figure 11:
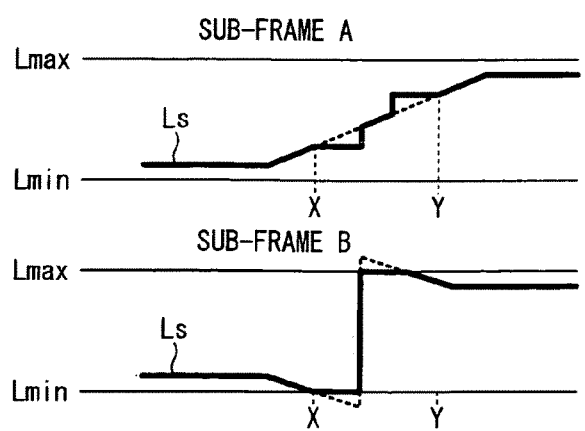

FIG. 11 is a view illustrating, for a case where the smoothing process of the present invention is carried out, a distribution of image signals in the sub-frame A and a distribution of image signals in the sub-frame B.

Figure 12:
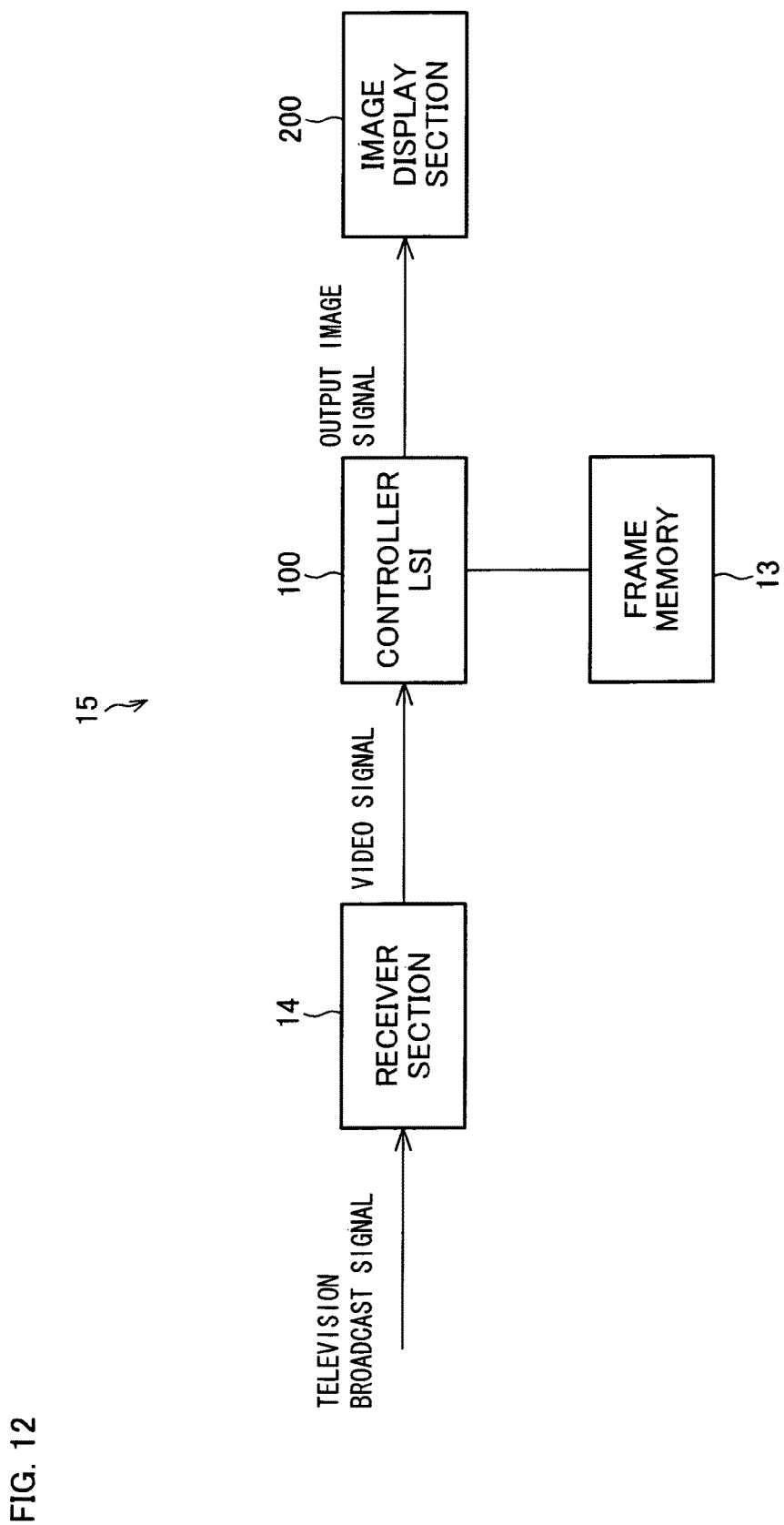

FIG. 12 is a block diagram illustrating one arrangement example of an image display apparatus which operates as a liquid crystal television receiver.

Figure 13:
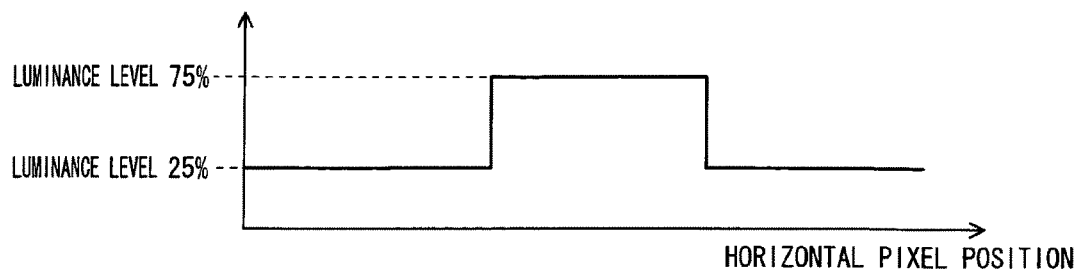

FIG. 13 is a graph showing luminance levels at horizontal pixel positions.

Figure 14:
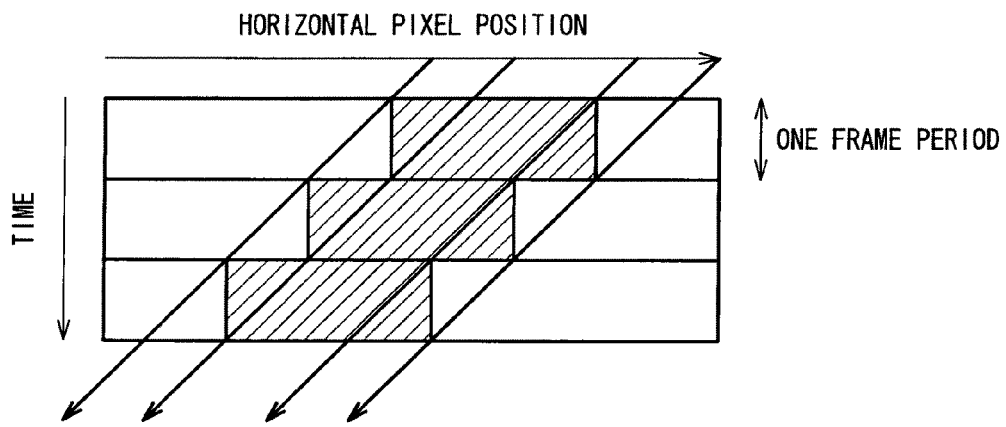

FIG. 14 is a view illustrating, for a case where an image moves horizontally, a temporal transition of a display luminance distribution.

Figure 15:
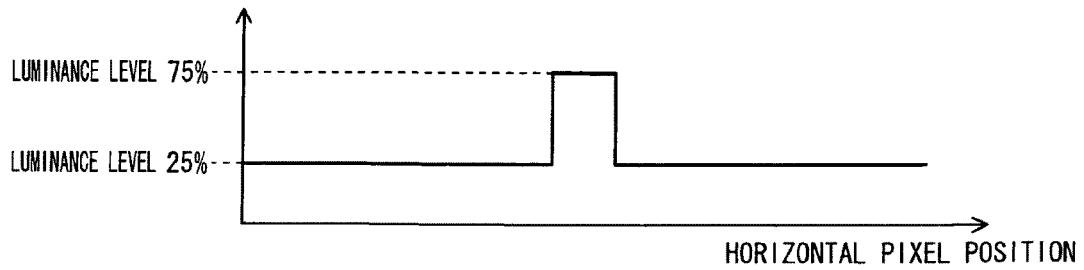

FIG. 15 is a graph showing luminance levels at horizontal pixel positions.

Figure 16:
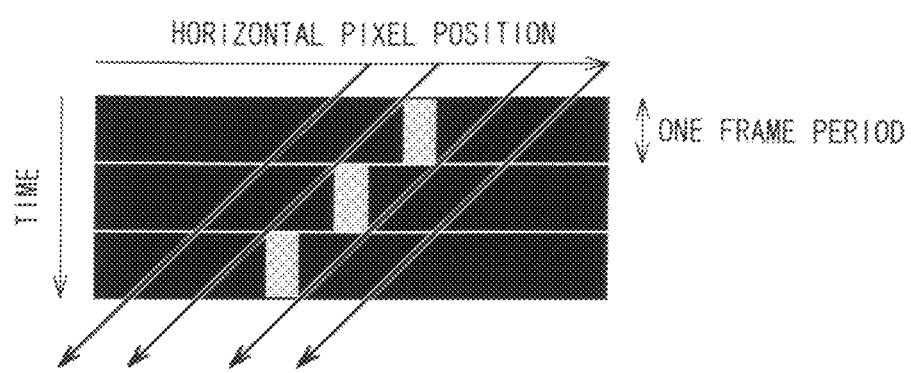

FIG. 16 is a view illustrating, for a case where an image moves horizontally, a temporal transition of a display luminance distribution.

Figure 17:
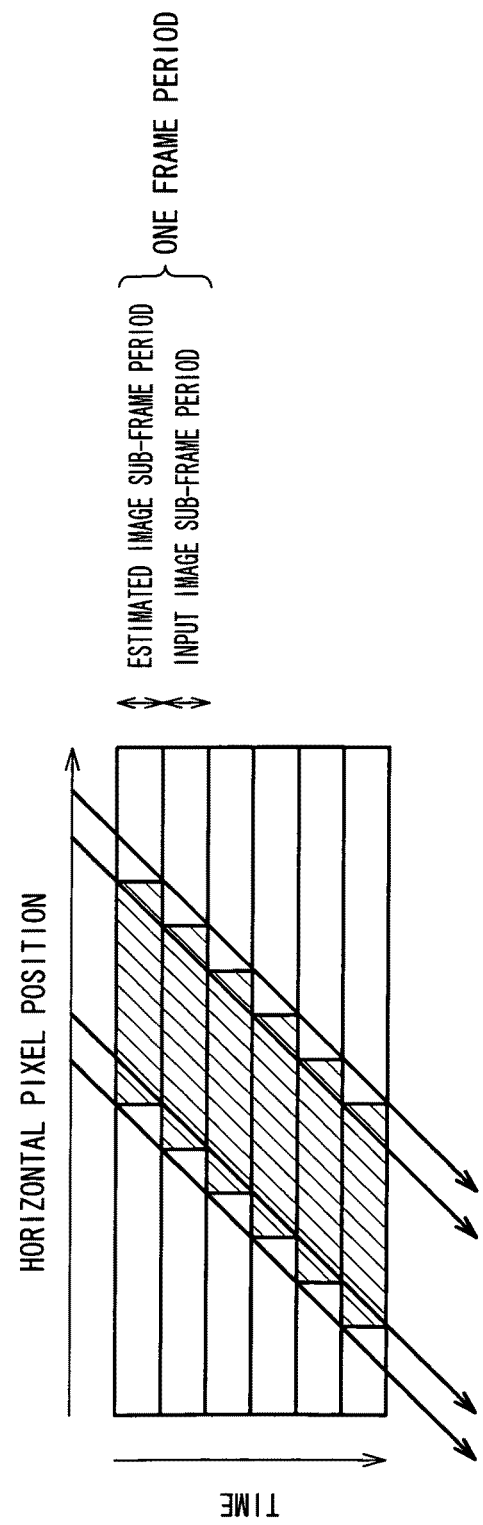

FIG. 17 is a view illustrating, for a case where an image moves horizontally, a temporal transition of a display luminance distribution.

Figure 18:
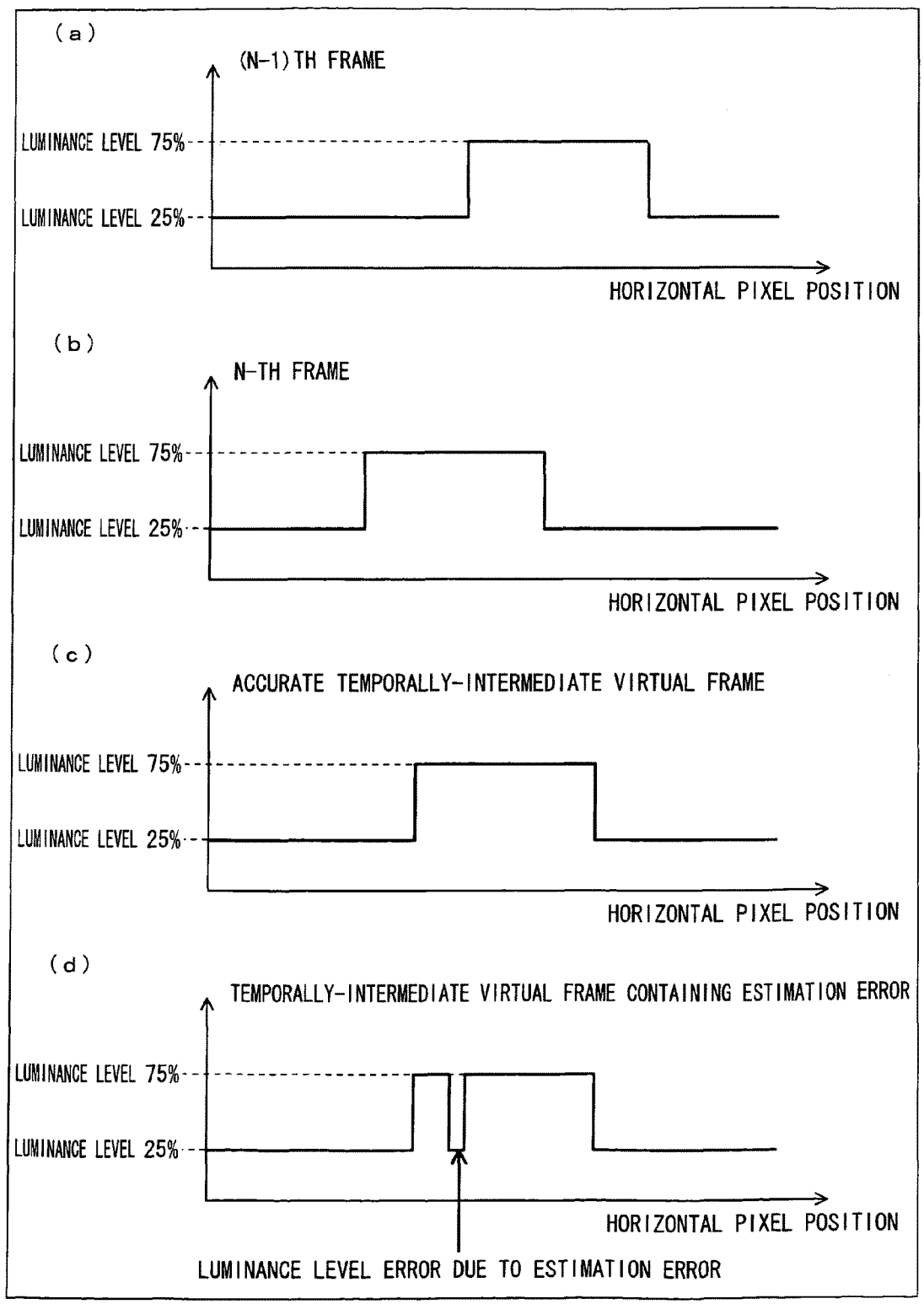

(a) to (d) of FIG. 18 are graphs showing, for respective frames, luminance levels at horizontal pixel positions.

DESCRIPTION OF EMBODIMENTS

The following describes one embodiment of the present invention.

[Embodiment]

The present embodiment premises an image signal processing apparatus provided in an image display apparatus in which a hold-type display apparatus such as a liquid crystal display apparatus is used and which displays an image, in accordance with image signals supplied to respective pixels, for every frame period corresponding to image signals for one screen. On this premise, the present embodiment is characterized in that the following processes are carried out by the image signal processing apparatus.

That is, in displaying an N-th frame, the image signal processing apparatus of the present embodiment generates a virtual sub-frame Q from image signals of an (N−1)th frame and an N-th frame, i.e., two adjacent frames so that each of pixels of the virtual sub-frame Q has, as its image signal level, an average of an image signal level of a corresponding pixel of the (N−1)th frame and that of the N-th frame.

Further, one frame period is time-divided into two sub-frame periods which have an identical period length.

In a sub-frame A period which is one of the two-sub-frame periods thus divided, image signals obtained by averaging (weighted averaging or simple averaging) image signals of pixels in a peripheral certain region (reference region) covering a target pixel of the virtual sub-frame Q are outputted as sub-frame A image signals.

On the other hand, in a sub-frame B period which is the other one of the two-sub-frame periods thus divided, an emphasizing process is carried out with respect to an average of input image signals which are supplied to pixels of the N-th frame which pixels correspond to pixels in a reference region covering a target pixel of the virtual sub-frame Q. Image signals thus obtained are outputted as sub-frame B image signals for emphasizing a difference between a high level and a low level of an input image signal for the target pixel.

In short, the image signal processing apparatus of the present embodiment can carry out the averaging process (smoothing process) in the sub-frame A period, and carry out the emphasizing process in the sub-frame B period.

Figure 1:
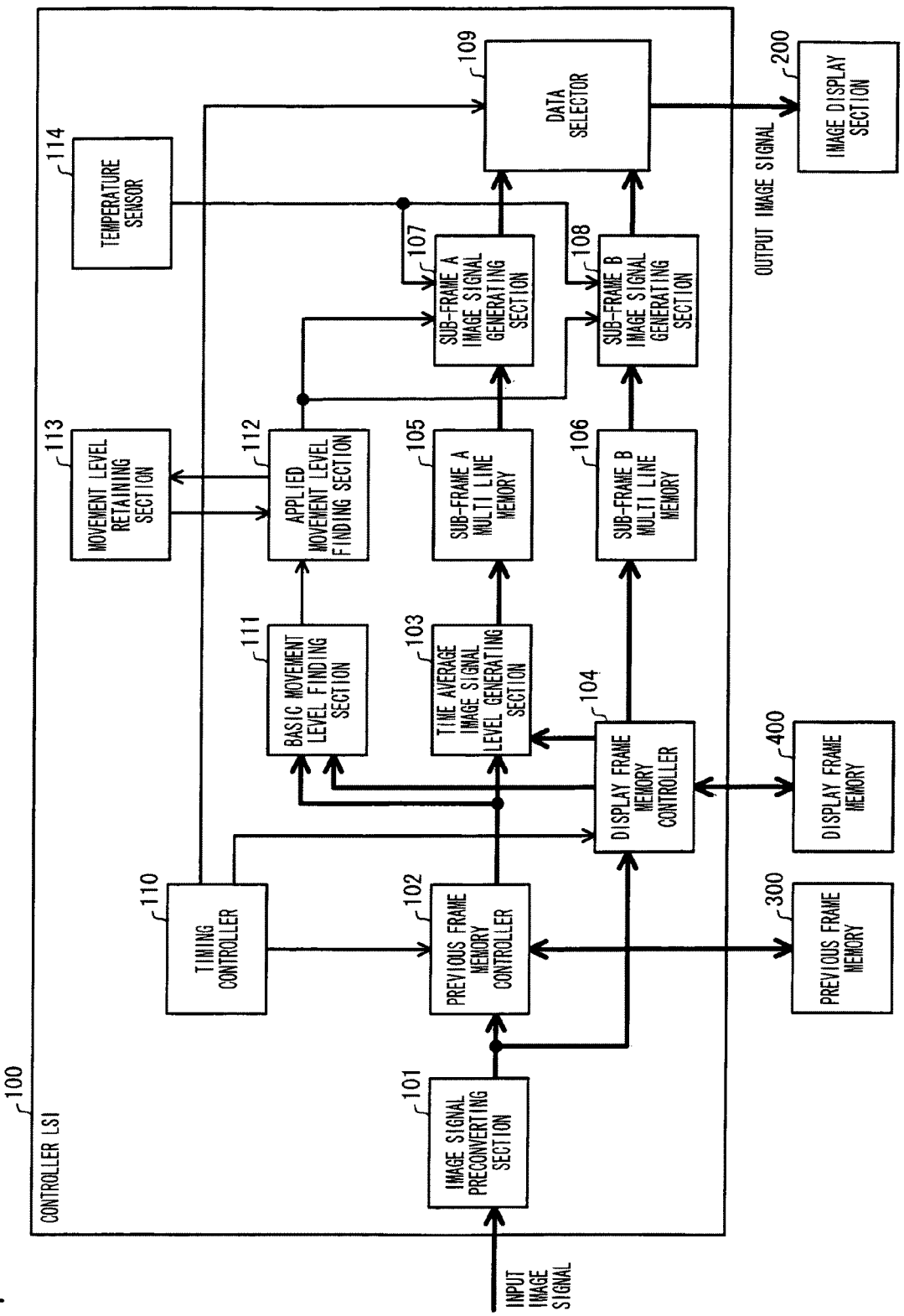
FIG. 1 is a block diagram illustrating one arrangement example of an image display apparatus of the present invention.

FIG. 1 is a schematic view illustrating an image display apparatus of the present embodiment.

As illustrated in FIG. 1, the image display apparatus includes a controller LSI 100 as an image signal processing apparatus. The controller LSI 100 is connected with: an image display section 200 such as a liquid crystal panel; a previous frame memory 300; and a display frame memory 400.

The controller LSI 100 includes: an image signal preconverting section (converting section) 101; a previous frame memory controller 102; a time average image signal level generating section 103; a display frame memory controller 104; a sub-frame A multi line memory 105; a sub-frame B multi line memory 106; a sub-frame A image signal generating section 107; a sub-frame B image signal generating section 108; a data selector 109; a timing controller (dividing section) 110; a basic movement level finding section (movement level detector section) 111; an applied movement level finding section (applied movement level finding section) 112; a movement level retaining section 113; and a temperature sensor (temperature detector section) 114.

The image signal preconverting section 101 carries out a predetermined converting process with respect to an input image signal supplied from outside of the controller LSI 100. More specifically, the image signal preconverting section 101 carries out the predetermined conversion process so that an input image signal is within a range from a predetermined upper limit and a predetermined lower limit. The predetermined conversion process can be carried out in accordance with a preference of a user or with a design objective of a product developer. How the predetermined conversion process is specifically carried out, and its effect of improvement of quality of a moving image are described later.

The timing controller 110 has a function of a dividing section which divides one frame period into a plurality of periods including at least one sub-frame A period and at least one sub-frame B period. In addition, the timing controller 110 generates respective timings of the sub-frame A period and the sub-frame B period into which an input frame period of 60 Hz is divided.

Further, the timing controller 110 controls the previous frame memory controller 102, the display frame memory controller 104, and the data selector 109.

The previous frame memory controller 102 (1) writes an input image signal of 60 Hz into the previous frame memory 300, and (2) sequentially reads out from the previous frame memory 300, in a accordance with a timing of the sub-frame A period, an image signal of a frame which is followed by a frame that the display frame memory controller 104 reads out, so as to transfer the image signal thus read out to the time average image signal level generating section 103. The previous frame memory controller 102 parallelly carries out operations of (1) and (2) above in a time division manner.

The display frame memory controller 104 (3) writes an input image signal of 60 Hz into the display frame memory 400, and (4) reads out from the display frame memory 400, an image signal of a frame which follows a frame that the previous frame memory controller 102 reads out, so as to transfer the image signal thus read out to the time average image signal level generating section 103, the sub-frame B multi line memory 106, and the basic movement level finding section 111. Specifically, the display frame memory controller 104 reads out an image signal of one same frame twice from the display frame memory 400 in accordance with respective timings of the sub-frame A period and the sub-frame B period. The display frame memory controller 104 parallelly carries out operations of (3) and (4) above in a time division manner.

The time average image signal level generating section 103 causes an arithmetic circuit or software to find an average of (i) an image signal level of a target pixel of a previous frame and (ii) an image signal level of the target pixel of a display frame (current frame), so as to generate a virtual sub-frame Q having the average as its image signal level.

The basic movement level finding section 111 compares an image signal of a current frame with an image signal of previous frame so as to serve as a movement level detector section which detects a movement level of a video image. Specifically, the basic movement level finding section 111 compares the image signal of the previous frame and the image signal of the current frame so as to obtain a numerical value as a movement level of a video image, in order that in accordance with the numerical value (calculation result), a difference is restricted between (i) a sub-frame A image signal or a sub-frame B image signal (the sub-frame A image signal and the sub-frame B image signal are described later) and (ii) an image signal of a target pixel which image signal has been subjected to the predetermined conversion process.

Specifically, a movement level is the number of such pixels that a difference between an image signal of a pixel of a previous frame and an image signal of the pixel of a current frame is not less than a predetermined value in a region (reference region) defined by horizontal X pixels and vertical Y lines in which region the target pixel is centered. As other method, there is a method in which differences each of which is a difference between an image signal level in the previous frame and an image signal level in the current frame are accumulated while more greatly weighting an image signal level of a reference pixel positioned closer to the target pixel in horizontal and vertical directions, and the thus obtained value is regarded as the movement level. Also, there is a method in which a pixel movement amount (motion vector amount) is estimated, and the thus estimated amount is regarded as the movement level.

An example of a method for estimating the pixel movement amount is as follows. Image signals of a certain region in a current frame which region centers a target pixel centered therein and image signals of plural certain regions in a previous frame are successively compared. In the previous frame, if a central pixel of the certain region is such that a total of level differences from the image signals of the certain region of the current frame is small, this central pixel is regarded as having moved to the target pixel of the current frame, and an amount of this movement is regarded as a movement amount of the target pixel. After estimating movement amounts of the respective pixels, the movement amount of the target pixel (i.e., an absolute value of the motion vector) is regarded as the movement level without any modification, or a total of movement amounts of peripheral pixels centering the target pixel is regarded as the movement level of the pixel, or a value obtained by accumulating the image signal levels is regarded as the movement level of the pixel while more greatly weighting an image signal level of a reference pixel positioned closer to the target pixel. According to the method, not only the movement amount of the pixel but also movement amounts of peripheral pixels are accumulated, so that it is possible to appropriately process a signal even if an abnormal vector is detected to some extent, but this method results in higher cost of the control section.

A value indicative of a basic movement level found by the basic movement level finding section 111 is supplied to the applied movement level finding section 112 which follows the basic movement level finding section 111. The applied movement level finding section 112 is described later in detail.

Each of the sub-frame A/B multi line memories 105 and 106 retains image signals corresponding to Y lines on and around a horizontal line being scanned for carrying out display.

The sub-frame A image signal generating section 107 serves as a first image processing section which carries out a smoothing process (blurring process) with respect to input image signals of pixels in the sub-frame A period, in accordance with the movement level of a video image. The movement level refers to an applied movement level found by the applied movement level finding section 112 (to be described later).

Specifically, in case where the value calculated by the applied movement level finding section 112 satisfies a certain condition (below-described condition (a)), the sub-frame A image signal generating section 107 inputs, via the sub-frame A multi line memory 105, image signals corresponding to the range in the virtual sub-frame Q which range is defined by the horizontal X pixels and the vertical Y lines with the target pixel centered in the range. Thereafter, the sub-frame A image signal generating section 107 accumulates image signal levels of respective pixels in the region, defined by X×Y pixels (i.e., the reference region) while weighting the image signal levels, and a total of the accumulated values is divided by a total of weighting factors for the respective pixels in the reference region, and the thus obtained value is regarded as a sub-frame A image signal. That is, the sub-frame A image signal is an image signal obtained in such a manner that the input image signals of the pixels are subjected to the smoothing process in accordance with the movement level (applied movement level) of a video image in the sub-frame A period. Note that, the weighting may be carried out by equally weighting image signal levels of the respective pixels in the reference region (by using the weighting factor equal to each other) or may be carried out by more greatly weighting an image signal of a pixel positioned closer to the target pixel.

Accordingly, the sub-frame A image signal generating section 107 which serves as the first image processing section carries out each process at a processing intensity which varies depending on the applied movement level found by the applied movement level finding section 112 to be described later.

In case where the value calculated by the applied movement level finding section 112 satisfies a certain condition, the sub-frame B image signal generating section 108 inputs, via the sub-frame B multi line memory 106, image signals of the respective pixels in the reference region with the target pixel centered. Thereafter, with respect to the reference region, the sub-frame B image signal generating section 108 carries out calculation in the same manner as in generation of the sub-frame A image signal. That is, as is the case with the sub-frame A image signal generating section 107, the sub-frame B image signal generating section 108 has a function of smoothing an image signal. The sub-frame B image signal generating section 108 carries out the smoothing process with respect to an image signal in the reference region, as in the case of the sub-frame A image signal.

The sub-frame B image signal generating section 108 serves as a second image processing section which carries out an emphasizing process with respect to input image signals of pixels in the sub-frame B period, in accordance with the movement level of a video image. The movement level refers to an applied movement level found by the applied movement level finding section 112 (to be described later).

Specifically, the sub-frame B image signal generating section 108 generates the sub-frame B image signal for the target pixel so that a time integration quantity of a display luminance level in a single virtual frame period, which display luminance level is constituted of (i) an image signal subjected to the smoothing process, i.e., an image signal obtained as a result of the calculation and (ii) the sub-frame B image signal, is identical to a luminance level observed in case where an image based on a preconverted image signal for the target pixel becomes still. Therefore, the sub-frame B image signal is an image signal obtained in such a manner that input image signals of pixels are subjected to the emphasizing process in accordance with the movement level (applied movement level) of a video image in the sub-frame B period. That is, the sub-frame B image signal is determined so that a time integration quantity of a luminance level of each pixel in a single frame period is identical to a luminance level observed in case where an image based on a preconverted image signal for the target pixel becomes still.

Specifically, there is a method in which calculation is carried out in accordance with a response speed performance of an image display panel (image display section 200), and also there is method in which: a luminance indicated by each image signal is measured, and there is provided a conversion table for outputting a sub-frame B image signal suitable for each combination of the input image signal and the image signal obtained as a result of the foregoing calculation.

Accordingly, the sub-frame B image signal generating section 108 which serves as the second image processing section carries out each process at a processing intensity which varies depending on the applied movement level found by the applied movement level finding section 112 to be described later.

The data selector 109 selects the sub-frame A image signal or the sub-frame B image signal in accordance with a current display sub-frame phase so as to forward the selected signal to the image display section 200.

According to the present embodiment, the applied movement level finding section 112 and the movement level retaining section 113 are provided in addition to the basic movement level finding section 111, in order that the sub-frame A image signal generating section 107 and the sub-frame B image signal generating section 108 can appropriately carry out processing without causing deterioration of quality of a moving image. The applied movement level finding section 112 and the movement level retaining section 113 are described later in detail.

The following briefly describes a relationship between a horizontal pixel position and a luminance level, for a case where the image display apparatus thus arranged displays a moving image.

Figure 2:
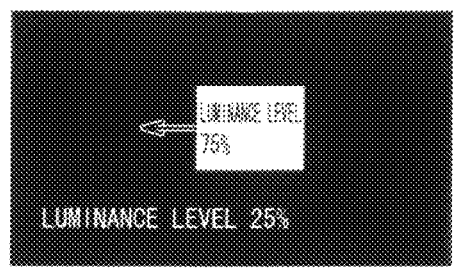
FIG. 2 is a view illustrating that a region having an image signal luminance level of 75% horizontally moves on a background having an image signal luminance level of 25%.

Note a single horizontal line on a screen in case where an object whose width is larger than a movement amount in a single frame period and whose luminance level is 75% moves horizontally on a background whose luminance level is 25% as illustrated in FIG. 2. In other words, note a single horizontal line on the screen in a case where an object having a luminance level of 75% horizontally moves on a background having a luminance of 25%, and the object has a width (length along the moving direction) larger than its movement amount per one frame period.

In this case, a luminance level distribution of input image signals of an (N−1)th frame is as illustrated in (a) of FIG. 3, and a luminance level distribution of input image signals of an N-th frame is as illustrated in (b) of FIG. 3. At this time, a luminance level distribution in a single horizontal line of the virtual sub-frame Q using, as an image signal level, an intermediate value of input image signal levels for each pixel after conversion of the N-th frame and the (N−1)th frame is as illustrated in (c) of FIG. 3.

The following explains a single horizontal line of a screen in case where as illustrated in FIG. 4, an object whose region has a smaller width than a movement amount in a single frame period and whose luminance level is 75% moves horizontally on a background whose luminance level is 25%. In other words, note a single horizontal line on the screen in a case where an object having a luminance level of 75% horizontally moves on a background having a luminance of 25%, and the object has a width (length along the moving direction) smaller than its movement amount per one frame period.

In this case, for example, (a) of FIG. 5 indicates a luminance level distribution of input image signals of the (N−1)th frame, and (b) of FIG. 5 indicates a luminance level distribution of input image signals of the N-th frame. (c) of FIG. 5 indicates a luminance level distribution in a single horizontal line of the virtual sub-frame Q constituted of an image signal level obtained by averaging input image signals of the N-th frame and the (N−1)th frame for each pixel.

Assume: that video image of a higher frame rate such as a video image of a common television into which a video image of a low frame rate such as a movie is converted; and a slow-motion replay or the like on a DVD player or the like. In these cases, identical images of a plurality of frames can be repeatedly displayed after an image corresponding to one frame is displayed. As one example of such a video image, FIG. 6 shows states of input images, for a case where the input images are replayed in slow motion on a DVD player or the like. FIG. 6 assumes a case where the input images are replayed at a reproduction speed of ⅓ of a normal reproduction speed.

(a) of FIG. 6 shows frames of the input images in order of (1), (2), . . . . Although the input images are such that a bright rectangular block moves leftward on a dark background, a single image is supplied for three frames indicated by (1) to (3), and another single image is supplied for three frames indicated by (4) to (6), for the reason that the input images are replayed in slow motion.

The basic movement level finding section 111 of the image processing apparatus finds basic movement levels so that frames indicated by (1), (4), and (7) which are different from their respective previous frames have respective basic movement levels of more than 0 whereas frames indicated by (2), (3), (5), and (6) which are identical with their respective previous frames have a basic movement level of 0. (b) of FIG. 6 shows changes of a basic movement level which is found from a pixel near an edge of the rectangular block thus moving.

FIG. 7 shows a distribution of image signals supplied after being subjected to the smoothing process and the emphasizing process which are carried out in accordance with the basic movement level thus found. Specifically, FIG. 7 shows the distribution of the image signals of pixels on one horizontal line within the screen. The blurring process and the emphasizing process are carried out with respect only to two output sub-frames corresponding to each of the input frames indicated by (1) and (4) which have respective basic movement levels. In FIG. 7, a waveform in a case where any one of the blurring process and the emphasis process has been carried out is indicated by a continuous line whereas a waveform in a case where any one of the blurring process and the emphasis process has not been carried out is indicated by a dashed line.

As shown in FIG. 7, there are display frames which are subjected to none of the blurring process nor the emphasizing process. This leads to a problem in that a viewer sees a flicker on a screen in a case where each of the blurring process and the emphasizing process is carried out for a long period.

In order that such a flicker is suppressed, according to the present embodiment, the basic movement level finding section 111, the applied movement level finding section 112, and the movement level retaining section 113 are provided.

The applied movement level finding section 112 finds an applied movement level to be supplied to the sub-frame A image signal generating section 107 having the first image processing section and/or to the sub-frame B image signal generating section 108 having the second image processing section, from (i) a movement level of a video image of a current frame period which movement level is detected by the basic movement level detector section 111 and (ii) a movement level of a video image of a previous frame period which movement level is detected by the basic movement level detector section 111.

That is, the applied movement level finding section 112 compares a basic movement level found by the basic movement level finding section 111 with a movement level which has been (i) retained in the movement level retaining section 113 as a result of previous processing and has been (ii) applied to the smoothing process and the emphasizing process which have been carried out respectively in two sub-frames corresponding to a previous input frame. In a case where the movement level thus retained is larger than the basic movement level, the applied movement level finding section 112 adopts an average of the movement level thus retained and the basic movement level as an applied movement level. On the other hand, in a case where the movement level thus retained is equal to or less than the basic movement level, the applied movement level finding section 112 adopts the basic movement level as an applied movement level.

The applied movement level thus determined is applied to the smoothing process which is carried by the sub-frame A image signal generating section 107 and to the emphasizing process which is carried out by the sub-frame B image signal generating section 108. In addition, the applied movement level thus found is written into the movement level retaining section 113 so as to be used in next image display.

Specifically, the applied movement level finding section 112 supplies to the sub-frame A image signal generating section 107 and to the sub-frame B image signal generating section 108, as an applied movement level, a simple average or a weighted average of Mc and Mh, if Mc<Mh where Mc is a movement level of a video image of a current frame, and Mh is a movement level retained in the movement level retaining section 113.

In addition, the applied movement level finding section 112 supplies Mc to the sub-frame A image signal generating section 107 and to the sub-frame B image signal generating section 108, as an applied movement level, if Mc Mh where Mc is a movement level of a video image of a current frame, and Mh is a movement level retained in the movement level retaining section 113.

The applied movement level finding section 112 simply compares, in its calculation, a movement level Mc of a video image of a current frame with a movement level Mh retained in the movement level retaining section 113. For more appropriate processing, the applied movement level finding section 112 preferably compares a movement level Mc with a value obtained by adding or subtracting a predetermined threshold value T to/from a movement level Mh retained in the movement level retaining section 113.

In a case where a noise is caused in a broadcast wave, a video signal transmission path, or the like, it is determined that a movement level is increased or decreased due to a difference caused between a previous frame and a current frame, despite the fact that a substantial still image is actually indicated by the previous and current frames having no noise. The arrangement above is adopted so that in such a case, processing which is carried out in a case where a movement level is 0 is also carried out in a case where such a variation of movement level falls within a certain range.

(c) of FIG. 6 shows changes of an applied movement level which is found from a pixel near an edge of the moving rectangular block, for a case where such processing is carried out. In each of the frames indicated by (1), (4), and (7) which are different from their respective previous frames, a retained movement level is smaller than a basic movement level. Accordingly, the basic movement level is adopted as an applied movement level. As a result, the applied movement level is equal to a corresponding one in (b) of FIG. 6. On the other hand, in each of the frames indicated by (2), (3), (5), and (6), a retained movement level is larger than a basic movement level. Accordingly, an average (simple average or weighted average) of the retained movement level and the basic movement level is adopted as an applied movement level. As a result, the applied movement level is larger than a corresponding one in (b) of FIG. 6.

FIG. 8 shows a distribution of image signals supplied after being subjected to the smoothing process and the emphasizing process which are carried out in accordance with the basic movement level thus found. Specifically, FIG. 8 shows the distribution of the image signals of pixels on one horizontal line within the screen. In FIG. 8, a waveform in a case where any one of the blurring process and the emphasis process has been carried out is indicated by a continuous line whereas a waveform in a case where any one of the blurring process and the emphasis process has not been carried out is indicated by a dashed line.

According to FIG. 8, it is not that the blurring process or the emphasizing process is not completely carried out in displaying of each of the sub-frames indicated by (2A) to (3B) although respective degrees of the blurring process and the emphasizing process are decreased, as compared to FIG. 7 which shows a case where a basic movement level is used as it is. This makes it possible to prevent a flicker from being seen.

The image display apparatus thus arranged matches, with an appropriate display luminance, a time integral quantity of display luminances of a case where an image signal generated by the sub-frame A image signal generating section 107 and an image signal generated by the sub-frame B image signal generating section 108 are successively displayed. Thus, the image display apparatus prevents a viewer from recognizing an excess or a deficiency of a luminance.

FIG. 9 shows a distribution of image signal levels, for a case where the blurring process and the emphasizing process of the present embodiment are carried out with respect to the vicinity of a boundary between two regions (an image signal of a previous frame and an image signal of a current frame) having respective different tones.

FIG. 10 shows an emphasized signal in the sub-frame B, for a case where one of the two regions has a signal level close to a maximum signal level that the image display section 200 can display, and the other one of the two regions has a signal level close to a minimum signal level that the image display section 200 can display. In FIG. 10, an ideal emphasized signal is generated so as to have a part (i.e., part indicated by an upper dashed line) which exceeds the maximum signal level and a part which falls below the minimum signal level. The image display apparatus actually has no choice but to display the emphasized signal within a range of signal levels that the image display section 200 can display. In such a case, there arises a problem in that a viewer seeing repetition of a blurred image in a sub-frame A and an emphasized image in a sub-frame B recognizes an inappropriate luminance for the reason that a time integrated luminance is insufficient or excessive as compared to an appropriate luminance.

In order that such a problem is alleviated or prevented, it is conceivable that: an intergradation width of an image signal which is supplied to the sub-frame A image signal generating section 107 is limited in the sub-frame A image signal generating section 107 in a case where the image signal have a signal level close to the maximum or minimum signal level, and similarly, an intergradation width of an image signal which is supplied to the sub-frame B image signal generating section 108 is limited in the sub-frame B image signal generating section 108 in a case where the image signal have a signal level close to the maximum or minimum signal level.

For example, each of the sub-frame A image signal generating section 107 and the sub-frame B image signal generating section 108 carries out the smoothing process by use of an intergradation width which is set such that an image signal which has been subjected to the smooth process has a smaller signal level as it is closer to the maximum signal level or the minimum signal level of an image signal that the image display section can display.

One method of the emphasizing process is such that: the sub-frame B image signal generating section 108 first carries out the same smoothing process as the sub-frame A image signal generating section 107, and a selects, as an emphasized signal to be outputted, such an image signal that a time integrated luminance obtained in a case where the image signal and an image signal obtained as a result of the smoothing process are displayed on the image display section in an alternate and repeated manner matches an appropriate luminance of a target pixel.

In a case where a emphasized signal is generated by the method, limitation of the intergradation width which is used in the smoothing process which is carried out by the sub-frame A image signal generating section 107 is also set with respect to the intergradation width which is used in the smoothing process which is carried out by the sub-frame B image signal generating section 108. This makes it possible to match the time integrated luminance obtained in a case where the image signal obtained from the sub-frame A image signal generating section 107 and the image signal obtained from the sub-frame B image signal generating section 108 are displayed on the image display section in an alternate and repeated manner with the appropriate luminance of the target pixel. Note that a certain effect can be obtained even if the limitation is set with respect only to the intergradation width of the sub-frame A image signal generating section 107 so that a cost of a control circuit section is suppressed.

For example, each of the sub-frame A image signal generating section 107 and the sub-frame B image signal generating section 108 limits respective intergradation widths within W which satisfies the following formula (1), where: Ls is a signal level of an image signal that each of the sub-frame A image signal generating section 107 and the sub-frame B image signal generating section 108 receives; Lmax is a maximum signal level that the image display section 200 can display; Lmin is a minimum signal level that the image display section 200 can display; and W is the limitation of the intergradation width for the smoothing process.

$$W = \min(C0 + |Ls - L\min| \times K0, C1 + |L\max - Ls| \times K1) \quad (1)$$

In the formula (1): min (X, Y) is a function for selecting a smaller one of X and Y; C0 and C1 are constants of the intergradation width; K0 is a proportionality factor of the intergradation width with respect to a difference between the minimum signal level and an original signal level; and K1 is a proportionality factor of the intergradation width with respect to a difference between the maximum signal level and the original signal level.

For example, the formula (1) is expressed as: W=min (0+90×0.25=22.5, 5+10×0.25=7.5)=7.5, where: Lmax=100; Lmin=0; C0=0; C1=5; and K0=K1=0.25. As a result, the intergradation width is limited to 7.5 in respective smoothing processes of the sub-frame A image signal generating section 107 and the sub-frame B image signal generating section 108. That is, a signal level of an image signal subjected to the smoothing process is limited so as not to take a value of less than 82.5 which is obtained by subtracting 7.5 from 90. Accordingly, an ideal value of the emphasized signal corresponding to the signal level thus smoothed does not greatly exceed an Lmax of 100. This makes it possible to keep, within a desired range, an error between an actual time integral quantity and an appropriate time integral quantity, in a case where the emphasized signal whose ideal value exceeds Lmax is displayed as having a signal level of 100.

FIG. 11 shows an image signal obtained by the method. In the sub-frame A, the dashed line indicates a waveform of an image signal subjected to the smoothing process without limitation of the intergradation width. In other words, the image signal according to the present embodiment is limited by the intergradation width between the horizontal pixel positions X and Y in the sub-frame A.

This makes it possible to prevent a viewer from recognizing an inappropriate luminance because a time integrated luminance does not greatly become insufficient or excessive even if an image signal in a sub-frame B is within the maximum level and the minimum level.

In a case where a liquid crystal display panel is adopted as the image display section 200 of the image display apparatus thus arranged, a response speed of liquid crystal of the liquid crystal display panel decreases by a temperature decrease in the image display apparatus. Therefore, the smoothing process and the emphasizing process above leads to a larger error between an actual display luminance and an appropriate luminance. This results in a deterioration of image quality.

Therefore, the controller LSI 100 in FIG. 1 houses a temperature sensor (temperature detector section) 114 so that temperature data obtained by the temperature sensor 114 is supplied to the sub-frame A image signal generating section 107 and the sub-frame B image signal generating section 108.

Each of the sub-frame A image signal generating section 107 and the sub-frame B image signal generating section 108 carries out the smoothing process by use of an intergradation width which is set such that an image signal subjected to the smoothing process has a smaller signal level as a temperature indicated by supplied temperature data is lower than a predetermined temperature.

This makes it possible to appropriately carry out the smoothing process in accordance with a response speed of the liquid crystal. As a result, it becomes possible to suppress deterioration of quality of a moving image.

Furthermore, as illustrated in FIG. 12, the image display apparatus of the present embodiment can be realized as, e.g., a liquid crystal television receiver 15. Specifically, the liquid crystal television receiver 15 can include a receiver section 14 which makes it possible to (i) select a channel so as to receives a television broadcast, and (ii) supply to the controller LSI 100, as an input image signal, a video signal indicative of a video image transmitted via the television broadcast. In this case, the image display section 200 can be realized as a liquid crystal panel, and arranged to display an image in accordance with an output image signal supplied from the controller LSI 100 which output image signal is generated in accordance with the video signal and supplied by the controller LSI 100.

This makes it possible to provide a television receiver which can display a high-quality video image, also in the case of a slow-moving image or a still image, not to mention a fast-moving image.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The image display apparatus and the image display method of the present invention is applicable to electronic devices such as: an image display module and a devices capable of displaying a moving image in which image display module and devices liquid crystal, organic EL, an electronic paper, or a display device which carries out hold-mode display is used; a TV; a PC monitor; a DVD player with a monitor; a game machine; a car navigation system; a portable videoplayer; and a portable phone.

REFERENCE SIGNS LIST

100 Controller LSI
101 Image signal preconverting section
102 Previous frame memory controller
103 Time average image signal level generating section
104 Display frame memory controller
105 Sub-frame A multi line memory
106 Sub-frame B multi line memory
107 Sub-frame A image signal generating section (first image processing section)
108 Sub-frame B image signal generating section (second image processing section)
109 Data selector
110 Timing controller (dividing section)
111 Basic movement level finding section (movement level detector section)
112 Applied movement level finding section (applied movement level detector section)
113 Movement level retaining section
114 Temperature sensor (temperature detector section)
300 Previous frame memory
400 Display frame memory

The invention claimed is:

1. An image signal processing apparatus provided in an image display apparatus for displaying an image, in accordance with image signals supplied to respective pixels, for every frame period corresponding to image signals for one (1) screen, the image signal processing apparatus comprising:
 a movement level detector section which detects a first movement level of a video image corresponding to a current frame period, by comparing (i) image signals corresponding to the current frame period with (ii) image signals corresponding to a previous frame period followed by the current frame period;
 a dividing section which divides one (1) frame period into a plurality of periods containing at least one sub-frame A period and at least one sub-frame B period;
 a first image processing section which carries out a smoothing process in the at least one sub-frame A period, in accordance with a second movement level, with respect to input image signals to be supplied to respective pixels;
 a second image processing section which carries out an emphasis process in the at least one sub-frame B period, in accordance with the second movement level, with respect to input image signals to be supplied to respective pixels; and
 a movement level finding section which finds the second movement level from (i) the first movement level of the video image corresponding to the current frame period and (ii) a previous movement level of a video image corresponding to the previous frame period.

2. The image signal processing apparatus as set forth in claim 1, further comprising:
 a retaining section which retains the second movement level found by the movement level finding section,
 the movement level finding section configured to find the second movement level by using the second movement level retained by the retaining section as the previous movement level.

3. The image signal processing apparatus as set forth in claim 2, wherein the first image processing section and the second image processing section which carry out the smoothing process and the emphasis process, at respective processing intensities which vary depending on the second movement level found by the movement level finding section.

4. The image signal processing apparatus as set forth in claim 3, wherein, if Mc<Mh, the movement level finding section supplies to the first image processing section and the second image processing section, as the second movement level, an average or a weighted average of Mc and Mh, where Mc is the first movement level, and Mh is the second movement level retained by the retaining section.

5. The image signal processing apparatus as set forth in claim 3, wherein, if Mc≥Mh, the movement level finding section supplies Mc to the first image processing section and the second image processing section, as the second movement level, where Mc is the first movement level, and Mh is the second movement level retained by the retaining section.

6. An image signal processing apparatus provided in an image display apparatus for displaying an image, in accordance with image signals supplied to respective pixels, for every frame period corresponding to image signals for one (1) screen, the image signal processing apparatus comprising:
a dividing section which divides one (1) frame period into a plurality of periods containing at least one sub-frame A period and at least one sub-frame B period;
a first image processing section which carries out a smoothing process with respect to input image signals to be supplied to respective pixels, in the at least one sub-frame A period; and
a second image processing section which carries out an emphasis process with respect to input image signals to be supplied to respective pixels, in the at least one sub-frame B period;
said first image processing section configured to carry out the smoothing process by use of an intergradation width which is set such that each of the input image signals which have been subjected to the smooth process has a smaller signal level as it is closer to a maximum signal level or a minimum signal level of image signals which the image display apparatus can display.

7. The image signal processing apparatus as set forth in claim 6, wherein, in a case where the second image processing section (i) carries out, with respect to the input image signals, an emphasis process by carrying out a smooth process and (ii) then supplies resultant signals to the image display apparatus, said second image processing section carries out the smoothing process by use of an intergradation width which is set such that each of the input image signals which have been subjected to the emphasis process has a smaller signal level as it is closer to a maximum signal level or a minimum signal level of image signals which the image display apparatus can display.

8. The image signal processing apparatus as set forth in claim 6, further comprising:
a temperature detector section which detects a temperature in the image signal processing apparatus,
said first image processing section carrying out the smoothing process by use of an intergradation width which is set such that each of the input image signals which have been subjected to the smoothing process has a smaller signal level as a temperature detected by the temperature detector section is lower than a predetermined temperature.

9. The image signal processing apparatus as set forth in claim 6, further comprising:
a temperature detector section which detects a temperature in the image signal processing apparatus, wherein
said second image processing section carrying out the smoothing process by use of an intergradation width which is set such that each of the input image signals which have been subjected to the emphasis process has a smaller signal level as a temperature detected by the temperature detector section is lower than a predetermined temperature.

10. An image signal processing method for causing an image display apparatus to display an image, in accordance with image signals supplied to respective pixels, for every frame period corresponding to image signals for one (1) screen, the image signal processing method comprising the steps of:
(a) detecting a first movement level of a video image corresponding to a current frame period, by comparing (i) image signals corresponding to the current frame period with (ii) image signals corresponding to a previous frame period followed by the current frame period;
(b) dividing one (1) frame period into a plurality of periods containing at least one sub-frame A period and at least one sub-frame B period;
(c) carrying out a smoothing process in the at least one sub-frame A period, in accordance with a second movement level, with respect to input image signals to be supplied to respective pixels;
(d) carrying out an emphasis process in the at least one sub-frame B period, in accordance with the second movement level, with respect to input image signals to be supplied to respective pixels; and
(e) finding the second movement level from (i) the first movement level of the video image corresponding to the current frame period and (ii) a previous movement level of a video image corresponding to the previous frame period.

11. The image signal processing method as set forth in claim 10, further comprising the step of:
(f) retaining, in a retaining section, the second movement level found in the step of (e),
in the step of (e), the second movement level being found by use of the second movement level retained by the retaining section as the previous movement level.

12. The image signal processing method as set forth in claim 11, wherein, in the steps of (c) and (d), the smoothing process and the emphasis process are carried out at respective processing intensities which vary depending on the second movement level found in the step of (e).

13. The image signal processing method as set forth in claim 12, wherein if Mc<Mh, a simple average or a weighted average of Mc and Mh is supplied to the steps of (c) and (d), as the second movement level, in the step of (e), where Mc is the first movement level, and Mh is the second movement level retained by the retaining section.

14. The image signal processing method as set forth in claim 12, wherein, if Mc≥Mh, Mc is supplied to the steps of (c) and (d), as the second movement level, in the step of (e), where Mc is the first movement level, and Mh is the second movement level retained by the retaining section.

15. An image signal processing method for causing an image display apparatus to display an image, in accordance with image signals supplied to respective pixels, for every frame period corresponding to image signals for one (1) screen, the image signal processing method comprising the steps of:

(g) dividing one (1) frame period into a plurality of periods containing at least one sub-frame A period and at least one sub-frame B period;

(h) carrying out a smoothing process with respect to input image signals to be supplied to respective pixels, in the at least one sub-frame A period; and (i) carrying out an emphasis process with respect to input image signals to be supplied to respective pixels, in the at least one sub-frame B period;

in the step of (h), the smoothing process being carried out by use of an intergradation width which is set such that each of the input image signals which have been subjected to the smooth process has a smaller signal level as it is closer to a maximum signal level or a minimum signal level of image signals which the image display apparatus can display.

16. The image signal processing method as set forth in claim 15, wherein, in a case where in the step of (d), an emphasis process is carried out with respect to the input image signals by carrying out a smooth process and then resultant signals are supplied to the image display apparatus, the smoothing process is carried out in the step of (i) by use of an intergradation width which is set such that each of the input image signals which have been subjected to the emphasis process has a smaller signal level as it is closer to a maximum signal level or a minimum signal level of image signals which the image display apparatus can display.

17. The image signal processing method as set forth in claim 16, further comprising the step of (j) detecting a temperature in the image display apparatus, in the step of (h), the smoothing process being carried out by use of an intergradation width which is set such that each of the input image signals which have been subjected to the smoothing process has a smaller signal level as a temperature detected in the step of (j) is lower than a predetermined temperature.

18. An image display apparatus comprising an image signal processing apparatus recited in claim 1.

19. A television receiver comprising an image display apparatus recited in claim 18.

20. An electronic device comprising an image display apparatus recited in claim 18.

* * * * *